US008593624B2

(12) United States Patent
Kusaka et al.

(10) Patent No.: US 8,593,624 B2
(45) Date of Patent: Nov. 26, 2013

(54) REFRACTIVE INDEX MEASURING APPARATUS

(75) Inventors: Yusuke Kusaka, Osaka (JP); Yohei Takechi, Osaka (JP); Atsushi Fukui, Osaka (JP); Seiji Hamano, Hyogo (JP); Kazumasa Takata, Osaka (JP)

(73) Assignee: Panasonic Corporation, Osaka (JP)

( * ) Notice: Subject to any disclaimer, the term of this patent is extended or adjusted under 35 U.S.C. 154(b) by 484 days.

(21) Appl. No.: 12/990,547

(22) PCT Filed: Jan. 21, 2010

(86) PCT No.: PCT/JP2010/000311
§ 371 (c)(1),
(2), (4) Date: Nov. 1, 2010

(87) PCT Pub. No.: WO2010/084748
PCT Pub. Date: Jul. 29, 2010

(65) Prior Publication Data
US 2011/0051127 A1    Mar. 3, 2011

(30) Foreign Application Priority Data

Jan. 22, 2009  (JP) ................................ 2009-011530

(51) Int. Cl.
*G01N 21/41*    (2006.01)
(52) U.S. Cl.
USPC .......................................... 356/128; 356/517
(58) Field of Classification Search
USPC .................... 356/124, 128–129, 517–518
See application file for complete search history.

(56) References Cited

U.S. PATENT DOCUMENTS

| 5,469,261 A | * | 11/1995 | Hellmuth et al. | 356/497 |
| 5,526,118 A | * | 6/1996 | Miyagawa et al. | 356/484 |
| 5,767,971 A | * | 6/1998 | Kawai et al. | 356/493 |
| 2008/0013071 A1 | * | 1/2008 | Tsumura et al. | 356/51 |

FOREIGN PATENT DOCUMENTS

| JP | 6-174430 | 6/1994 |
| JP | 8-261728 | 10/1996 |
| JP | 2001-4538 | 1/2001 |
| JP | 2001-21448 | 1/2001 |
| JP | 2003-106934 | 4/2003 |

OTHER PUBLICATIONS

International Search Report issued Apr. 27, 2010 in International (PCT) Application No. PCT/JP2010/000311.
International Preliminary Report on Patentability and Written Opinion of the International Searching Authority issued Aug. 18, 2011 in corresponding International (PCT) Application No. PCT/JP2010/000311.

* cited by examiner

*Primary Examiner* — Gregory J Toatley
*Assistant Examiner* — Dominic J Bologna
(74) *Attorney, Agent, or Firm* — Wenderoth, Lind & Ponack, L.L.P.

(57) ABSTRACT

By using two probe optical systems for measurement by disposing the probe optical systems with a test object sandwiched therebetween, an optical path length of light transmitted through the test object which is identified locally is calculated using an interference signal thereof. In addition, a geometrical thickness of the same part is calculated by measuring positions of the probe optical systems, whereby two calculated values are obtained. Based on the values and a calculated value for a reference object, a refractive index distribution of the test object is obtained.

6 Claims, 10 Drawing Sheets

REFRACTIVE INDEX MEASURING APPARATUS

TECHNICAL FIELD

The present invention relates to a refractive index measuring apparatus suitable to measure a refractive index distribution of an optical member such as an aspherical, spherical, or curved lens.

BACKGROUND ART

For an optical element to be used for digital copying or digital cameras, there is a molded lens.

The molded lens is superior in the fabricability of an aspherical lens to a polished glass lens and is low in cost, but has an unstable side that non-uniformity is likely to occur in the refractive index distribution inside the lens, depending on the molding conditions. The non-uniformity of the refractive index inside the lens greatly affects the optical characteristics of the lens, which may cause degradation in image forming performance.

Because of this, to stabilize the quality of molded lenses, a distribution of refractive indices needs to be measured with high accuracy.

In recent years, a GRIN (GRadient-INdex) lens in which a refractive index gradient is intentionally provided in the lens has begun to be used in an optical communication field, etc. Since the GRIN lens can separate a shape and refractive index, the expansion of the application range thereof such as imaging systems is expected.

The GRIN lens is designed such that a refractive index distribution is intentionally provided to a glass material. Thus, for stable mass production, a distribution of refractive indices needs to be measured with high accuracy.

For conventional art for measuring a refractive index to handle such issues, there is a method in which a refractive index is determined by measuring an angle of deviation by a minimum deviation method, etc., or a method in which a test object is immersed in a solution whose refractive index is known, and observed and a refractive index of the test object is indirectly measured from the refractive index of the solution, or a method (Mach-Zehnder interferometer) in which interference fringes are observed which occur in plane-wave test light with plane-wave reference light and the plane-wave test light being transmitted through a state in which a test object is immersed in a matching liquid whose refractive index is known and substantially equal to that of the test object.

Figure 6:
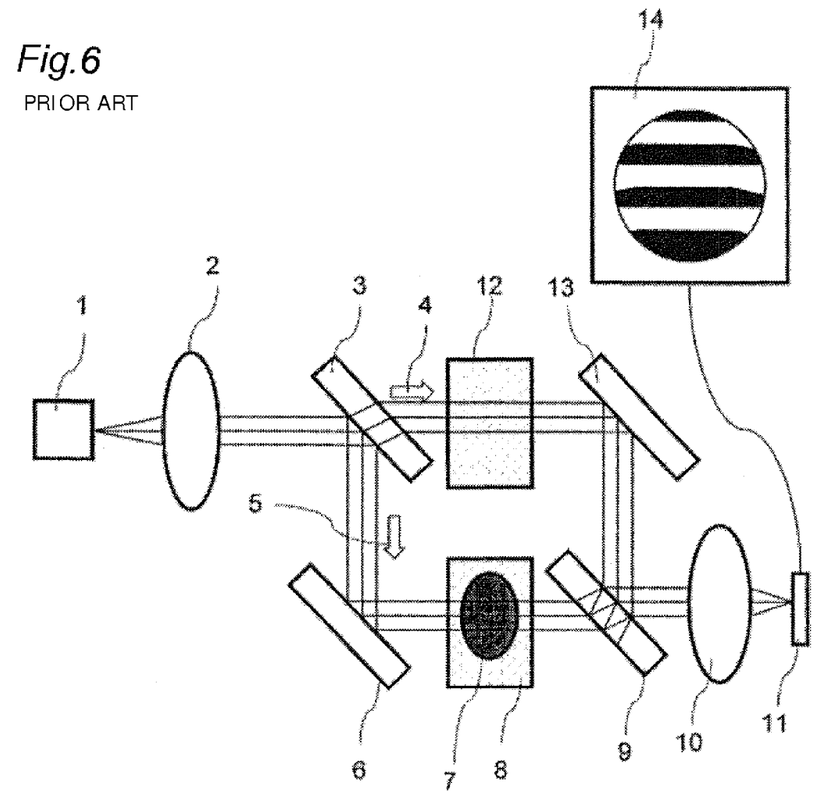
FIG. 6 is a view showing a refractive index measuring apparatus using a conventional Mach-Zehnder interferometer.

FIG. 6 is a view showing a refractive index measuring apparatus using a conventional Mach-Zehnder interferometer.

In FIG. 6, light emitted from a laser light source 1 is converted into parallel light by a condenser lens 2. Thereafter, the light is branched by a half mirror 3 into reference light 4 and test light 5. The test light is reflected by a mirror 6 and thereafter transmitted through a liquid immersion cell 8 filled with a matching liquid whose refractive index is substantially equal to that of a test object 7 and the test object 7 immersed therein, and thereby causes an optical path difference according to a refractive index distribution of the test object 7. Then, the test light 5 reaches a half mirror 9 and thereafter enters an imaging device 11 through an image forming lens 10.

On the other hand, the reference light 4 is transmitted through a compensating plate 12, reflected by a mirror 13, reaches the half mirror 9, and thereafter, enters the imaging device 11 through the image forming lens 10. The compensating plate 12 is to make an optical path length from the test light 5 to the imaging device 11 and an optical path length from the reference light 4 to the imaging device 11 substantially equal to each other.

In the imaging device 11, the test light 5 and the reference light 4 are combined and interference fringes 14 occur according to an optical path difference therebetween. In the interference fringe observation, by the number of fringes at a location where the interference fringes 14 occur, an optical thickness of the test object 7 in that part can be computed, from which a difference in the refractive index of the matching liquid is computed, whereby a refractive index of the test object 7 can be determined.

For the method using an interferometer using a matching liquid, there are one using a bath that increases the temperature uniformity of a matching liquid, one that achieves an increase in accuracy by introducing a phase shift method, and furthermore, one that enables to measure a three-dimensional distribution by using a CT scan (see, for example, Patent Document 1).

PRIOR ART DOCUMENTS

Patent Document

Patent Document 1: Japanese Unexamined Patent Publication No. 2001-21448

SUMMARY OF THE INVENTION

Issues to be Solved by the Invention

However, in the conventional method in which the angle of deviation is measured, a test object needs to be processed in a predetermined shape and thus there is an issue that an optical element which is a measurement target needs to be broken and polished.

In addition, in the method in which a test object is immersed in a matching liquid whose refractive index is substantially equal to that of the test object, measurement can be performed without breakage, but non-uniformity of the refractive index of the matching liquid causes large error, causing an issue that a control method therefor is difficult. Furthermore, the test object is narrowed to a range where the refractive index of the matching liquid is present, and many of matching liquids themselves are harmful to the environment and the human body, causing an issue that the convenience of measurement is impaired.

An object of the present invention is to solve the above-described conventional issues, and provide a refractive index measuring apparatus capable of easily measuring a refractive index distribution of a test object without breaking the test object.

Means for Solving the Issues

The present invention is configured as follows to attain the above-described object.

According to a first aspect of the present invention, there is provided a refractive index measuring apparatus comprising:
 a light source;
 a beam splitter that splits light from the light source into test light and reference light;
 a first probe optical system that collects the test light and then irradiates the test light onto a surface of a test object;
 a second probe optical system that collects the test light transmitted through the test object;

a driving unit that displaces the first probe optical system and the second probe optical system on one optical axis such that an optical axis of the first probe optical system and an optical axis of the second probe optical system maintain coaxiality;

a light-receiving element that allows the test light collected by the second probe optical system to interfere with the reference light and thereby obtains an interference signal; and a calculating unit that calculates a refractive index of the test object, based on the interference signal obtained by the light-receiving element.

According to a second aspect of the present invention, there is provided the refractive index measuring apparatus according to the first aspect, wherein the calculating unit calculates the refractive index of the test object, based on a calculated value of an interference signal of the test object and a calculated value of an interference signal which is obtained in advance using, instead of the test object, a reference object whose refractive index and thickness are known.

According to a third aspect of the present invention, there is provided the refractive index measuring apparatus according to the second aspect, further comprising:

a first length measuring unit that range-finds positions of the first probe optical system and the second probe optical system, as differences from reference positions of the respective probe optical systems;

a reference light mirror that is provided in an optical path of the reference light and adjusts an optical path length of the reference light; and a second length measuring unit that range-finds a position of the reference light mirror, as a difference from a reference position of the reference light mirror, wherein when the refractive index of the reference object is N0, the thickness of the reference object is D0, a total of the differences from the reference positions of the respective probe optical systems is $\Delta D$, and the difference from the reference position of the reference mirror is $\Delta ND$, the refractive index N of the test object is calculated by the calculating unit by a following (equation 1):

$$N=(2\Delta ND+N0 \times D0)/(\Delta D+D0) \quad \text{(equation 1)}.$$

According to a fourth aspect of the present invention, there is provided the refractive index measuring apparatus according to the first or second aspect, wherein a probe of one of the first probe optical system and the second probe optical system is such that only an end thereof in a range smaller than a wavelength of light irradiated therefrom is exposed and an other part of the probe is covered with an opaque covering layer, and a probe of an other probe optical system is such that only an end thereof in a range smaller than a wavelength of light irradiated therefrom is exposed and an other part of the probe of the other probe optical system is covered with a transparent covering layer.

According to a fifth aspect of the present invention, there is provided the refractive index measuring apparatus according to the first or second aspect, wherein a probe of one of the first probe optical system and the second probe optical system is such that only an end thereof in a range smaller than a wavelength of light irradiated therefrom is exposed and an other part of the probe is covered with an opaque covering layer, and a probe of an other probe optical system is such that only an end thereof in a range smaller than a wavelength of light irradiated therefrom is exposed and an other part of the probe of the other probe optical system is exposed without a covering layer.

According to a sixth aspect of the present invention, there is provided the refractive index measuring apparatus according to the first or second aspect, further comprising:

a moving mechanism that moves the first probe optical system and the second probe optical system in a coordinated manner with the coaxiality being maintained, wherein the test object is scanned while the first probe optical system and the second probe optical system are allowed to move, to calculate a refractive index distribution of the test object.

Effects of the Invention

By using the present invention, a refractive index distribution of the test object can be easily measured without breaking the test object.

BRIEF DESCRIPTION OF THE DRAWINGS

These and other objects and features of the present invention will become apparent from the following description in conjunction with a preferred embodiment for the accompanying drawings. In the drawings.

DESCRIPTION OF EMBODIMENTS

An embodiment of the present invention will be described below with reference to the drawings. Note that in the following description the same configurations are denoted by the same reference numerals and description thereof is omitted.

First Embodiment

Figure 1:
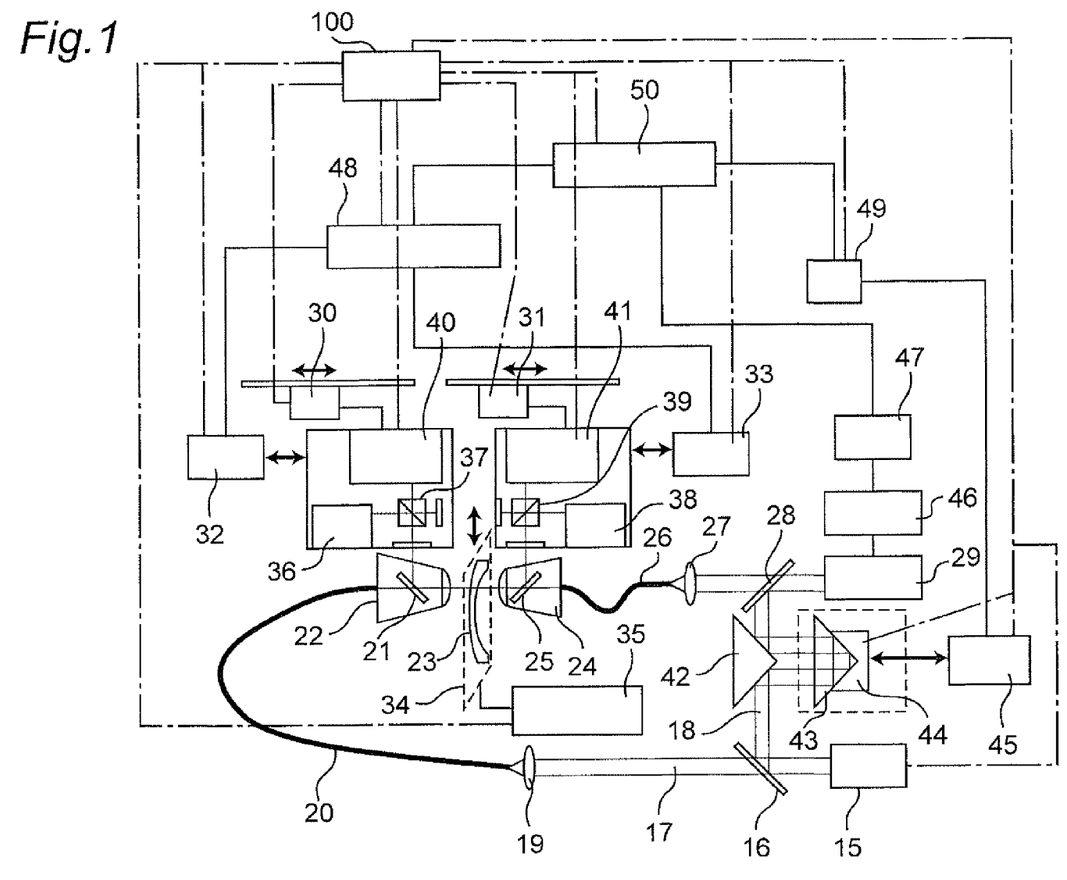
FIG. 1 is a conceptual configuration view of a refractive index measuring apparatus of a first embodiment of the present invention.
Figure 2:
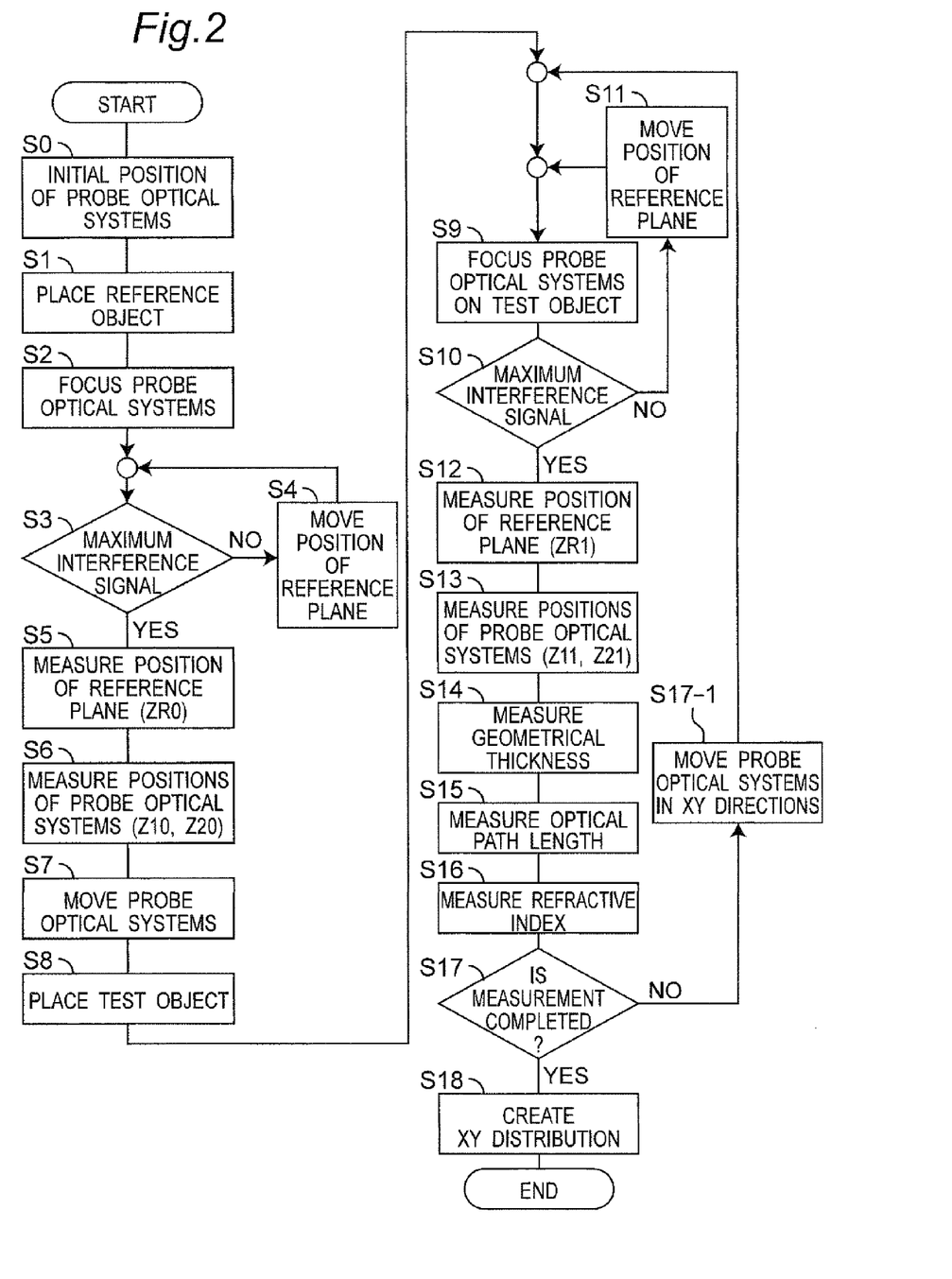
FIG. 2 is a flowchart for the refractive index measuring apparatus of the first embodiment.

FIG. 1 is a conceptual configuration view of a refractive index measuring apparatus in a first embodiment of the present invention. FIG. 2 is a flowchart of refractive index measurement in the first embodiment. Note that a refractive index distribution of a test object 23 which is an optical member can be automatically measured by a control unit 100 controlling the respective operations of a light source 15, driving units 30, 31, 35, and 44, a refractive index calculating unit 50, a computing unit 48, a computing unit 49, an interference signal computing unit 47, a length measuring machine 45, a length measuring machine 32, a length measuring machine 33, a focus detecting unit 40, a focus detecting unit 41, etc., which are described below.

In FIG. 1, a beam emitted from the light source 15, typified by an SLD (Super Luminescent Diode), which emits low coherent light is split by a beam splitter 16 into test light 17 and reference light 18.

The test light 17 enters a fiber 20 through a lens 19, enters a first probe optical system 22, is transmitted through a half mirror 21, and irradiated onto the test object 23. The test light 17 irradiated onto the test object 23 is transmitted through the test object 23 and collected by a second probe optical system 24. The test light collected by the second probe optical system 24 is transmitted through a half mirror 25, propagates through a fiber 26, is expanded by a lens 27, transmitted through a beam splitter 28, and reaches a light-receiving element 29.

The first probe optical system 22 and the second probe optical system 24 are disposed such that optical axes formed by the optical systems are coaxial. The first probe optical system 22 and the second probe optical system 24 are displaced by the driving unit 30 and the driving unit 31, respectively, on one optical axis such that their coaxiality is maintained. Then, the amounts of displacement are measured by the length measuring machine and the length measuring machine 33, and recorded in storage units respectively included in the length measuring machines 32 and 33. The length measuring machine 32 and the length measuring machine 33 function as an example of a first length measuring unit. Note that the driving unit 30 and the driving unit 31 preferably are mechanisms that move the first probe optical system 22 and the second probe optical system 24 in a coordinated manner with coaxiality being maintained; however, if they are allowed that an axis adjustment is made separately and furthermore adjustment time is increased, then the two probe optical systems 22 and 24 may be allowed to move individually and the axes may be adjusted to be coaxial finally.

Figure 9:
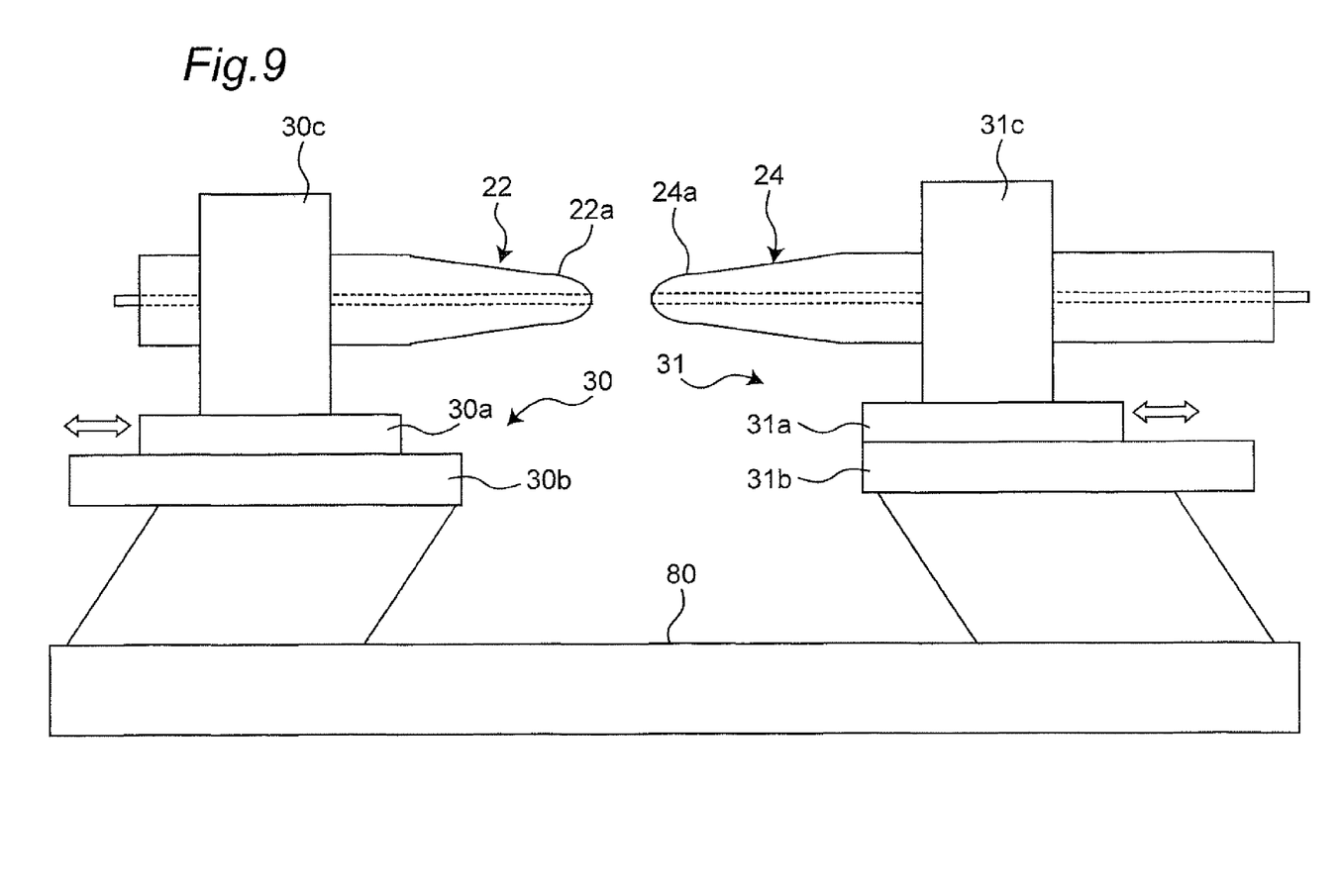
FIG. 9 is a side view for describing an example of a driving unit capable of displacing the first probe optical system and the second probe optical system in the refractive index measuring apparatus of the first embodiment such that coaxiality is maintained.

Each of the driving unit 30 and the driving unit functions as an example of a driving unit. As an example of each of the driving unit 30 and the driving unit 31, as shown in FIG. 9, the driving unit 30 and the driving unit 31 are disposed on one optical axis to face each other. Specifically, on a mounting board 80, a probe 22a of the first probe optical system 22 is supported by a probe retainer 30c. The probe retainer 30c is fixed to a first Z-axis driving unit 30a in a standing manner which can move back and forth along the optical axis, i.e., along a Z-axis. The first Z-axis driving unit 30a can move back and forth along the optical axis, i.e., along the Z-axis, on a strut 30b fixed onto the mounting board 80. Likewise, on the mounting board 80, a probe 24a of the second probe optical system 24 is supported by a probe retainer 31c to face the probe 22a of the first probe optical system 22. The probe retainer 31c is fixed to a second Z-axis driving unit 31a in a standing manner which can move back and forth along the optical axis, i.e., along the Z-axis. The second Z-axis driving unit 31a can move back and forth along the optical axis, i.e., along the Z-axis, on a strut 31b fixed onto the mounting board 80. Thus, by appropriately driving the first Z-axis driving unit 30a and the second Z-axis driving unit 31a, the first probe optical system 22 and the second probe optical system 24 can be displaced on a single optical axis such that the coaxiality is maintained. Each of the first Z-axis driving unit 30a and the second Z-axis driving unit 31a is configured by a known mechanism, e.g., a mechanism that uses a motor and relative drive of a nut to a ball screw by drive of the motor.

Figure 7:
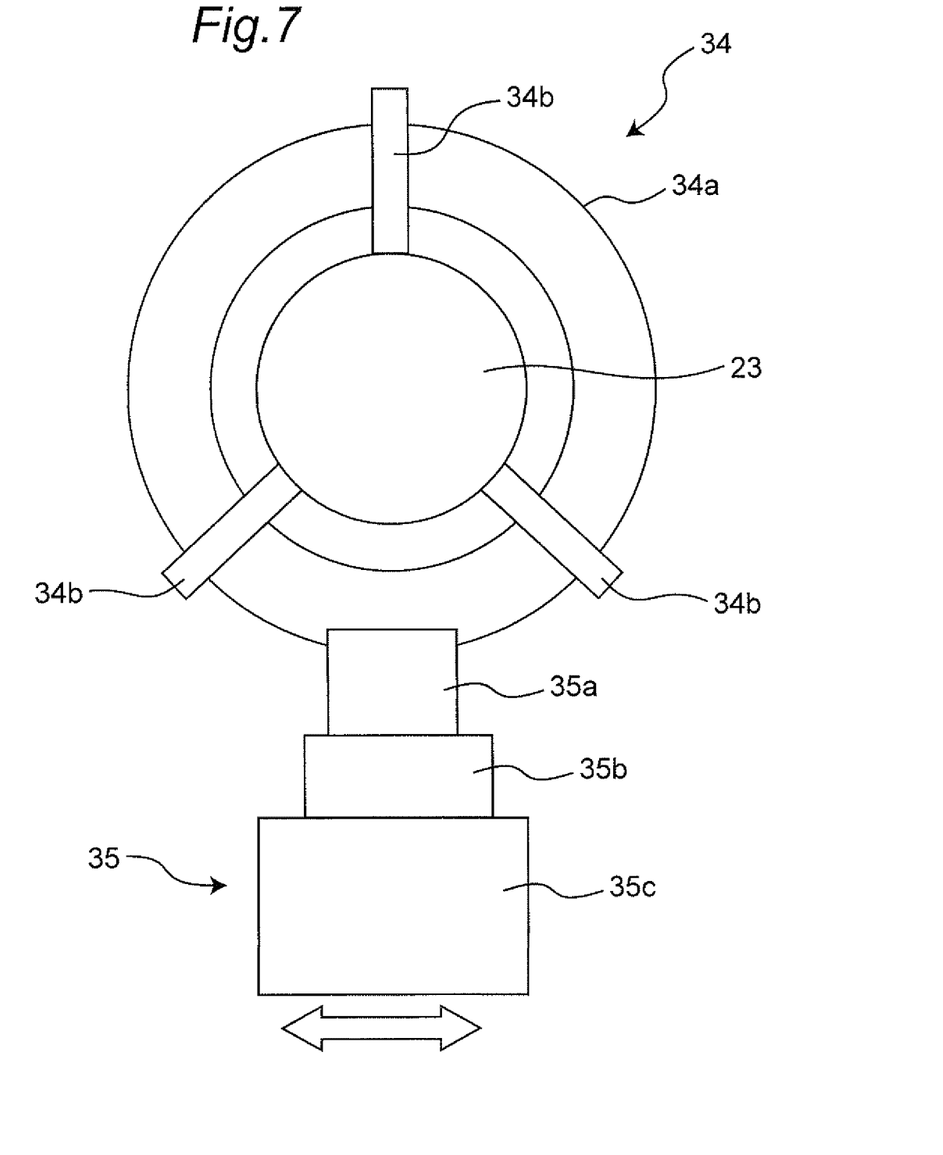
FIG. 7 is a front view for describing an example of a driving unit capable of displacing the test object on a plane perpendicular to optical axes formed by a first probe optical system and a second probe optical system in the refractive index measuring apparatus of the first embodiment.
Figure 8:
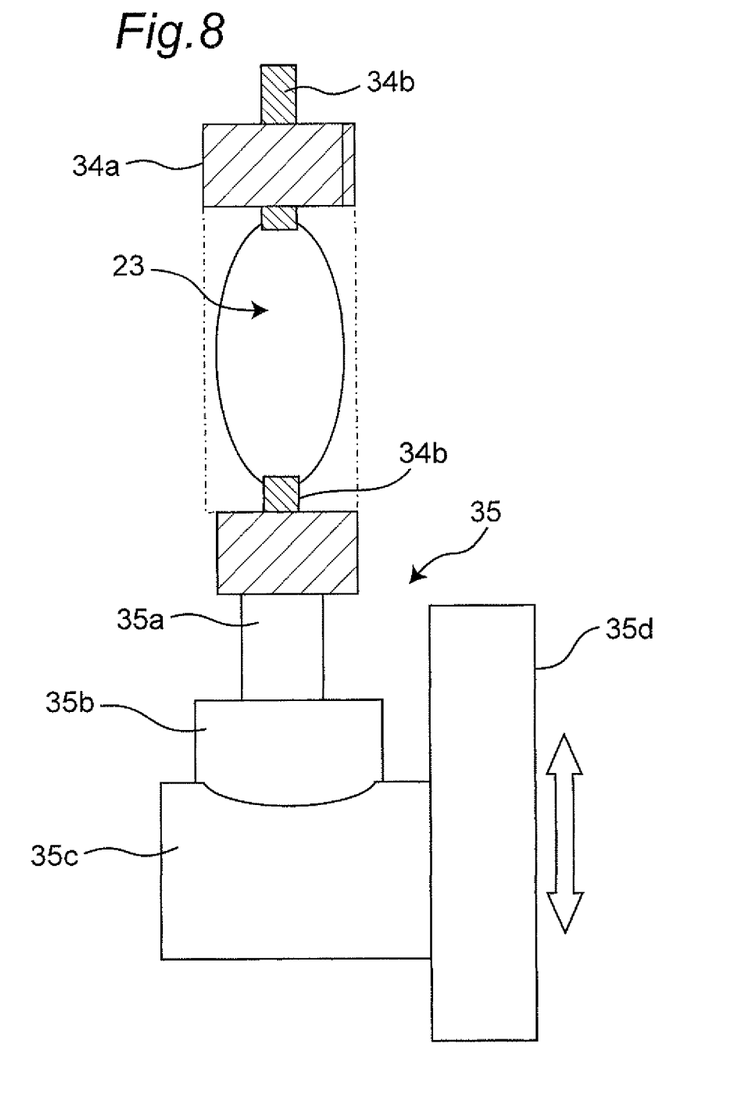
FIG. 8 is a side view for describing the example of the driving unit in FIG. 7.

The test object 23 is fixed by a holder (lens holder) 34. The holder 34 can displace, by the driving unit 35, the test object 23 on a plane perpendicular to the optical axes formed by the first probe optical system 22 and the second probe optical system 24. FIGS. 7 and 8 show examples of the holder 34 and the driving unit 35. The holder 34 can support the test object 23 by three braces 34b protruding toward the center from a ring-like support 34a at intervals of 120 degrees. The driving unit 35 is configured by a rotation adjusting unit 35a that is disposed at the lower end of the ring-like support 34a and that can adjust the rotation of the holder 34 about an axis in an up-down direction in FIG. 7; a tilt adjusting unit 35b that is disposed at the bottom of the rotation adjusting unit 35a and that can make a tilt adjustment to the holder 34 and the rotation adjusting unit 35a; an X-axis driving unit 35c that is disposed at the bottom of the tilt adjusting unit 35b and that can move the holder 34, the rotation adjusting unit 35a, and the tilt adjusting unit 35b in an X-axis direction; and a Y-axis driving unit 35d that is disposed at the rear of the X-axis driving unit 35c and that can move the X-axis driving unit 35c in a Y-axis direction orthogonal to an X-axis. Thus, by appropriately driving the X-axis driving unit 35c, the Y-axis driving unit 35d, the tilt adjusting unit 35b, and the rotation adjusting unit 35a, the test object 23 can be displaced on the plane perpendicular to the optical axes formed by the first probe optical system 22 and the second probe optical system 24. Each of the X-axis driving unit 35c, the Y-axis driving unit 35d, the tilt adjusting unit 35b, and the rotation adjusting unit 35a is configured by a known mechanism, e.g., a mechanism that uses a motor and relative drive of a nut to a ball screw by drive of the motor, a gear mechanism, or a rack and pinion mechanism.

In addition, each of the first and second probe optical systems 22 and 24 includes therein a focus mechanism and thereby has a mechanism capable of focusing the first and second probe optical systems 22 and 24 on a surface of the test object 23 at a constant distance.

Upon focusing, in the first and second probe optical systems 22 and 24, coherent light emitted from a light source 36 is reflected by a half mirror 37 and the half mirror 21 and reaches the test object 23. In addition, coherent light emitted from a light source 38 is reflected by a half mirror 39 and the half mirror 25, and reaches the test object 23. Then, each light reflected by the surface of the test object 23 follows an opposite optical path, is transmitted through the half mirror 37 or the half mirror 39, and reaches the focus detecting unit 40 or the focus detecting unit 41, whereby focus signals are obtained.

For the focus signals, when the first and second probe optical systems 22 and 24 are near-field probes, for example, by obtaining and maintaining a ratio of the intensity of reflected light to that of incident light as a signal, the distances between the surface of the test object 23 and the first and second probe optical systems 22 and 24 can be kept constant at nanometer scale. Alternatively, even by a method in which a shearing stress which is a mechanical interaction occurring between an end of a near-field probe and the surface of the test object 23 is measured and the probe is controlled such that the value of the shearing stress is constant, the distances between the surface of the test object 23 and the first and second probe optical systems 22 and 24 can be kept constant at nanometer scale.

On the other hand, the optical path of the reference light 18 branched by the beam splitter 16 is folded back by a mirror 42, and the reference light 18 reaches a corner cube 43, that is a reference plane, which is an example of a reference light mirror. Light reflected by the corner cube 43 returns to the mirror 42, enters the beam splitter 28, is reflected by the beam splitter 28, and reaches the light-receiving element 29.

The corner cube 43 can be displaced in the same direction as its optical axis by the driving unit 44 which is an example of a second length measuring unit. By the displacement, the optical path length of the reference light 18 can be adjusted. The driving unit 44 is configured by a known mechanism, e.g., a mechanism that uses a motor and relative drive of a nut to a ball screw by drive of the motor.

The amount of displacement of the corner cube 43 is measured by the length measuring machine 45 and recorded in a storage unit included in the length measuring machine 45.

In the beam splitter 28, when the reference light and the test light are combined and the difference in optical path length between the two lights is within the range of the coherence length of light emitted from the light source, interference occurs and an interference signal is observed by the light-receiving element 29. The interference light observed by the light-receiving element is converted into an electrical signal by an A/D converter 46, and the interference intensity of the signal is determined by the interference signal computing unit 47.

Positional information of the first probe optical system 22 and the second probe optical system 24 measured by the length measuring machine 32 and the length measuring machine 33 is sent to the computing unit 48, and the computing unit 48 computes a geometrical thickness.

Positional information of the corner cube 43 measured by the length measuring machine 45 is sent to the computing unit 49, and the computing unit 49 computes an optical thickness.

Based on the value of the geometrical thickness computed by the computing unit 48 and the value of the optical thickness computed by the computing unit 49, a refractive index is computed by the refractive index calculating unit 50.

Now, a method of measuring the interval between the surfaces of a lens which is the test object 23 by the above-described configuration will be described based on a flowchart in FIG. 2.

In FIG. 2, at step S0 (initial state), the first probe optical system 22 and the second probe optical system 24 are disposed such that the optical axes of the respective optical systems are coaxial, and are in an initial position.

Subsequently, at step S1, as a reference object 51, a plate (reference object 51) on a plane whose thickness (D0) and refractive index (N0) are known is held by the holder 34 and placed to be between the first probe optical system 22 and the second probe optical system 24 by the driving unit 35. At this time, the parallelism of the reference object 51 is adjusted to be perpendicular to the optical axes formed by the first probe optical system 22 and the second probe optical system 24. A method for the adjustment will be described later.

Subsequently, at step S2, the first probe optical system 22 and the second probe optical system 24 are focused on a surface of the reference object 51 by the focus mechanisms included in the respective optical systems.

Subsequently, at step S3, the interference signal computing unit 47 evaluates the intensity of an interference signal.

Here, if the interference signal is not maximum (if NO at step S3 in FIG. 2), then at step S4 the corner cube 43 serving as a reference plane is automatically displaced by the driving unit 44 that moves the corner cube 43, etc., such that the evaluated interference signal becomes maximum.

Subsequently, at step S5, a position of the corner cube 43 obtained when the interference signal is determined to be maximum is range-found (ranging-performed) by the length measuring machine 45, as a reference value (ZR0) of the position of the corner cube 43, and recorded. This value serves as a reference value of the length measuring machine 45. At this time, a direction going from the length measuring machine 45 to the corner cube 43 has a positive value.

Subsequently, at step S6, positions of the first probe optical system 22 and the second probe optical system 24 are respectively range-found (ranging-performed) by the length measuring machine 32 and the length measuring machine 33, as a reference value (Z10) of the position of the first probe optical system 22 and a reference value (Z20) of the position of the second probe optical system 24. These values serve as reference values of the length measuring machine 32 and the length measuring machine 33. At this time, directions on the optical axes (Z-axis) formed by the first and second probe optical systems 22 and 24, going from the length measuring machines to their corresponding probe optical systems have positive values. In addition, it is assumed that relative positions (XY axes) of the holder 34 for the test object to the first and second probe optical systems 22 and 24 are measured by other measuring units or means. At this time, directions going from the length measuring machines 32 and 33 that measure the positions of the probe systems of the respective first and second probe optical systems 22 and 24 to their corresponding probes have positive values.

Subsequently, at step S7, the gap between the first probe optical system 22 and the second probe optical system 24 is widened by the driving unit 30, in response to instructions from a measurer, and the reference object 51 is removed from the holder 34.

Subsequently, at step S8, an object to be measured 23 is held by the holder 34 and set to be between the first probe optical system 22 and the second probe optical system 24 by the driving unit 35. The first probe optical system 22 and the second probe optical system 24 are focused on a surface of the test object 23 by the focus mechanisms included in the respective optical systems. In which part of the test object 23 the refractive index is measured is determined by the focus position, and the focus position is controlled by the driving unit 35.

Subsequently, at step S10, the interference signal computing unit 47 evaluates the intensity of an interference signal.

Here, if the interference signal is not maximum (if NO at step S10 in FIG. 2), then at step S11 the corner cube 43 is displaced such that the interference signal becomes maximum.

Subsequently, at step S12, a position of the corner cube 43 obtained when the interference signal is determined to be maximum is range-found (ranging-performed) by the length measuring machine 45, as a measured value (ZR1) of the corner cube 43, and recorded.

Subsequently, at step S13, positions of the first probe optical system 22 and the second probe optical system 24 are respectively range-found (ranging-performed) by the length measuring machine 32 and the length measuring machine 33, as a measured value (Z11) of the first probe optical system 22 and a measured value (Z21) of the second probe optical system 24.

Subsequently, at step S14, a geometrical thickness D for the measured positions is calculated by the computing unit 48 by the following (equation 1).

$$D = -(Z11 + Z21) + (Z10 + Z20) + D0 \quad \text{(equation 1)}$$

Since the first probe optical system 22 and the second probe optical system 24 always keep a constant distance from the surface of the test object 23, the differences in the positions of the first and second probe optical systems 22 and 24 between when the reference object 51 is measured (reference values) and when the test object 23 is measured (measured values) correspond to the difference in geometrical thickness between the test object 23 and the reference object 51. This principle will be described later in FIGS. 4A and 4B.

Subsequently, at step S15, a geometrical thickness ND for the measured positions is calculated by the computing unit 48 by the following equation (2).

$$ND = -2 \times (ZR1 - ZR0) + N0 \times D0 \quad \text{(equation 2)}$$

Here, the light source 15 is a low-coherent light source typified by an SLD. When the difference in optical path length between the reference light 18 and the test light 17 reaches the coherent length or less, an interference signal is generated, and when such a difference in optical path length is just maximum, the difference becomes zero. Therefore, the difference in the position of the corner cube 43 serving as the reference plane between when the reference object 51 is measured and when the test object 23 is measured corresponds to the difference in optical path length between the test object 23 and the reference object 51. This principle will be described later in FIGS. 4A and 4B. The reason that in the above-described (equation 2) the value of the optical path length is twice the difference in the position of the corner cube 43 is that, due to the folding-back optical system, the movement of the corner cube 43 corresponds to a half of the amount of displacement of the optical path difference of the reference light 18.

Subsequently, at step S16, using the geometrical thickness and the optical path length which are determined at steps S14 and S15, a local refractive index N for the measured point is determined by the refractive index calculating unit 50, as shown in the following (equation 3).

$$N = ND/D \quad \text{(equation 3)}$$

Note that in equation (1) when the total of the differences in the positions of the two probe optical systems 22 and 24 between when the reference object is measured and when the test object is measured is put as $\Delta D$, $\Delta D$ is expressed by $$\Delta D = -(Z11 + Z21) + (Z10 + Z20) \quad \text{(equation 4)}.$$

Note also that in equation (2) when the total of the differences in the positions of the reference mirror between when the reference object is measured and when the test object is measured is put as $\Delta ND$, $\Delta ND$ is expressed by $$\Delta ND = -ZR1 + ZR0 \quad \text{(equation 5)}.$$

At this time, the local refractive index N calculated by (equation 3) is expressed by the following equation.

$$N = (2\Delta ND + N0 \times D0)/(\Delta D + D0) \quad \text{(equation 6)}$$

Subsequently, at step S17, the control unit 100 determines whether all parts of the test object 23 to be measured have been measured. If the control unit 100 determines that all parts have not been measured, then at step S17-1 the first probe optical system 22 and the second probe optical system 24 fall out of focus on the test object 23, and the test object 23 is moved by the driving unit 35 to a different part than the part where measurement is performed previously, and then, processing returns to step S9. If, at step S17, the control unit 100 determines that all parts of the test object 23 to be measured have been measured, then processing proceeds to step S18.

When processing returns to step S9, thereafter, steps S10 to S17 are repeated and local refractive indices for different parts are determined. If all parts of the test object 23 to be measured have been measured, then based on the measurements, at step S18 an XY distribution of refractive indices is created.

Here, an adjustment to the parallelism of the reference object 51 to the axes of the first and second probe optical systems 22 and 24 at step S0 can be made by focusing, at the aforementioned step S2, the first and second probe optical systems 22 and 24, setting a plurality of locations on an XY plane where the amounts of displacement of the first and second probe optical systems 22 and 24 are measured, and comparing values measured at the locations. Amounts of displacement in an optical axis direction of the first and second probe optical systems 22 and 24 are determined by reading values of the length measuring machines at the respective locations, and the orientation of the reference object 51 is adjusted by the holder 34 such that the values are uniform at the plurality of locations. By this, the parallelisms of the reference object 51 and the axes of the first and second probe optical systems 22 and 24 can coincide. Note, however, that in this case the reference object 51 is a fully parallel object.

As described above, in the present embodiment, the refractive index of the test object 23 is calculated by determining differences from the reference object 51 whose refractive index and thickness are known.

Specific configurations and more desirable configurations of the components in the present embodiment will be described below.

As specific examples of the light source 15 that irradiates low-coherence light, a Super Luminescent Diode (SLD), one obtained by dispersing light from a white light source (halogen lamp or xenon lamp) into a spectrum with a specific wavelength range by a monochrometer, a laser light-emitting diode, etc., can be used. The wavelength of the light source is not particularly limited, and wavelengths from ultraviolet to infrared can be used, but for coherence length, the shorter the more desirable. Specifically, it is desirable that the coherence length is in the order of 10 µm and the wavelength of the light source 15 is on the short wavelength side to the extent that the transmittance of the test object 23 does not decrease. The coherence length of the light source 15 affects the accuracy of the position of the reference plane. In the configuration of the present embodiment, by combining with phase-shifting interferometry, measurement can be performed with an accuracy of about 10 µm for the width of an interference intensity signal and with an accuracy of 1 µm or less for the accuracy of the position of the reference plane.

It is desirable that each of the first and second probe optical systems 22 and 24 is a near-field probe in which an opening thereof is a wavelength or less, a core that guides light waves is exposed only at an end of an optical fiber and sharpened, and a portion thereof other than the opening is covered with an opaque film of metal or the like. This is because in a near-field probe having an opening with a wavelength or more or an optical element such as an objective lens, the distance between a surface of a test object and a probe optical system is controlled on the order of wavelength; on the other hand, in a near-field probe having an opening with a wavelength or less, such a distance can be controlled on the order of nanometers, independent of the wavelength of light.

Figure 3:
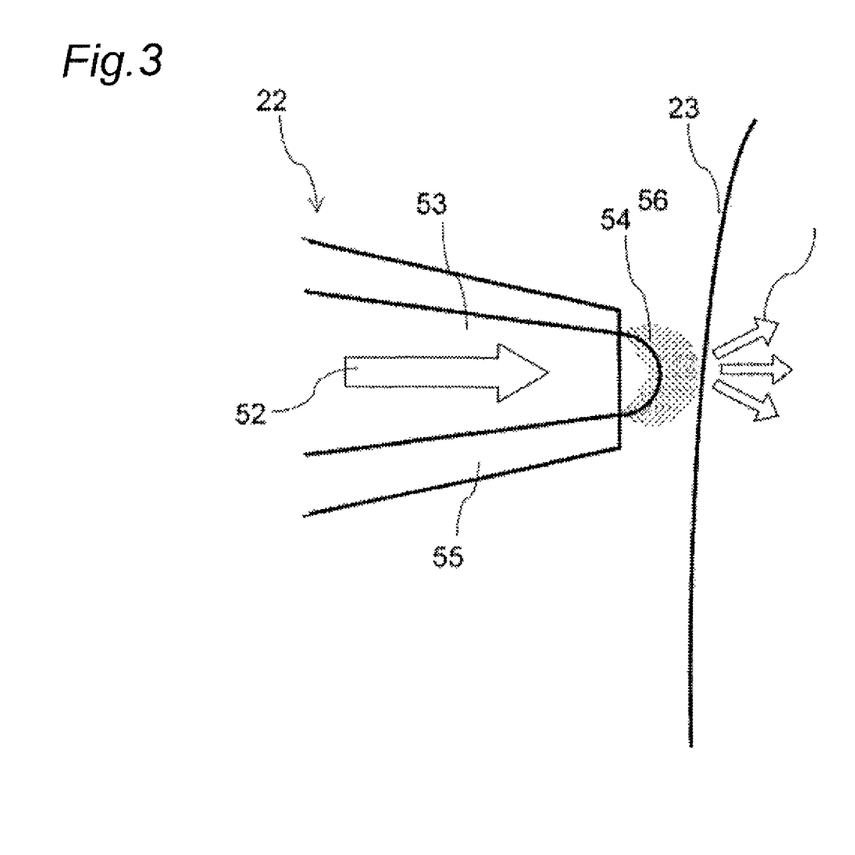
FIG. 3 is a view showing irradiation of near-field light from a probe optical system in the refractive index measuring apparatus of the first embodiment onto a surface of a test object.

FIG. 3 is a view showing irradiation of near-field light from a probe optical system in the first embodiment of the present invention onto a surface of a test object. Here, although description is made of only the case of using the first probe optical system 22, this principle is also the same for the second probe optical system 24.

In FIG. 3, incident light 52 is light that propagates from the light source 15 or the light source 36 for focusing. The incident light 52 propagates through an optical fiber 53 in the first probe optical system 22 and generates near-field light 54 at a tapered end. At this time, not only the near-field light remaining at the end of the probe but also propagating light that propagates from the end of the probe exist.

The end of the optical fiber 53 which is the first probe optical system 22 has an opening in a range smaller than the wavelength of irradiated light, i.e., on the order of nanometers, and a portion therearound is covered with an opaque film 55 formed of metal or the like (opaque light-shielding, covering layer).

When the near-field light 54 is present at a distance on the order of nanometers (on the order of 10 nm) from the surface of the test object 23, scattering occurs at the surface of the test object 23 and a part of the scattered light is transmitted through the test object 23 as transmitted light 56. Backscattered light that is reflected by the surface of the test object 23 passes through the optical fiber 53 and follows an opposite path. In addition, a part of the propagating light from the end of the probe is reflected backward by the surface of the test object 23 and the other part of the propagating light passes through the test object 23.

In FIG. 3, the spread-out radius of the near-field light from the end of the probe is about the size of the opening at the end of the first probe optical system 22, and is on the order of several nm to 100 nm.

Note that it is desirable that the second probe optical system 24 is, as with the first probe optical system 22, a near-field probe in which a core that guides light waves is sharpened at an end of an optical fiber, but the second probe optical system 24 preferably has an opening made as large as possible, unlike the first probe optical system 22. This is because the second probe optical system 24 needs to collect as much weak transmitted light emitted from the test object 23 as possible. Specifically, for example, it is desirable to use one in which the opening of the second probe optical system 24 has a size on the order of a wavelength, or one that is not covered with an opaque film of metal or the like (opaque covering layer) as much as possible, such as one in which only an end in a range smaller than the wavelength of irradiated light is exposed and the other part is covered with a transparent film (covered with a transparent covering layer) or one in which the second probe optical system 24 is not covered at all.

It is desirable that the length measuring machines 32 and 33 that range-found (ranging-performed) the amounts of displacement of the first and second probe optical systems 22 and 24 and the amount of displacement of the reference plane are laser length measuring machines, and are able to perform measurement with nanometer-order accuracy. By using them, the geometrical thickness of a test object can be measured with nanometer-order accuracy.

By using near-field probes for both the first and second probe optical systems 22 and 24, the distances between the surface of the test object 23 and the first and second probe optical systems 22 and 24 can be controlled on the order of nanometers. Furthermore, since the openings are small, there is an advantage that the start and end points of a light beam transmitted through the test object 23 can be identified.

It is desirable that the light-receiving element 29 is one that uses a detector with high sensitivity, such as a photomultiplier tube or an avalanche photodiode, in order to increase the intensity of an interference signal.

By the above-described configuration, a local refractive index of a test object is obtained by measuring a difference from the refractive index of the reference object 51, and depends upon the characteristics of the test object; for example, in the configuration such as that in the present embodiment, the accuracy thereof is about one in the fourth decimal place.

Figure 4A:
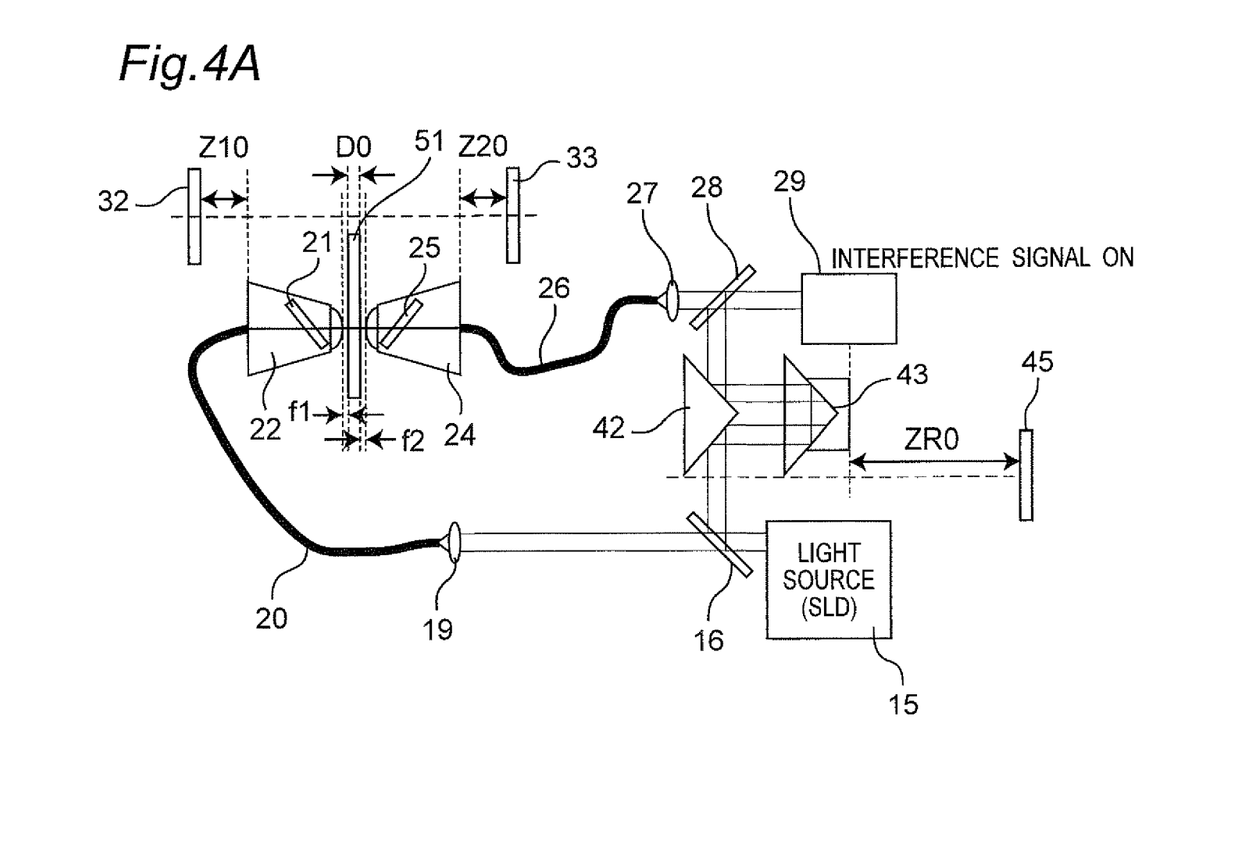
FIG. 4A is a view showing a principle for when a reference object is measured in the refractive index measuring apparatus of the first embodiment.
Figure 4B:
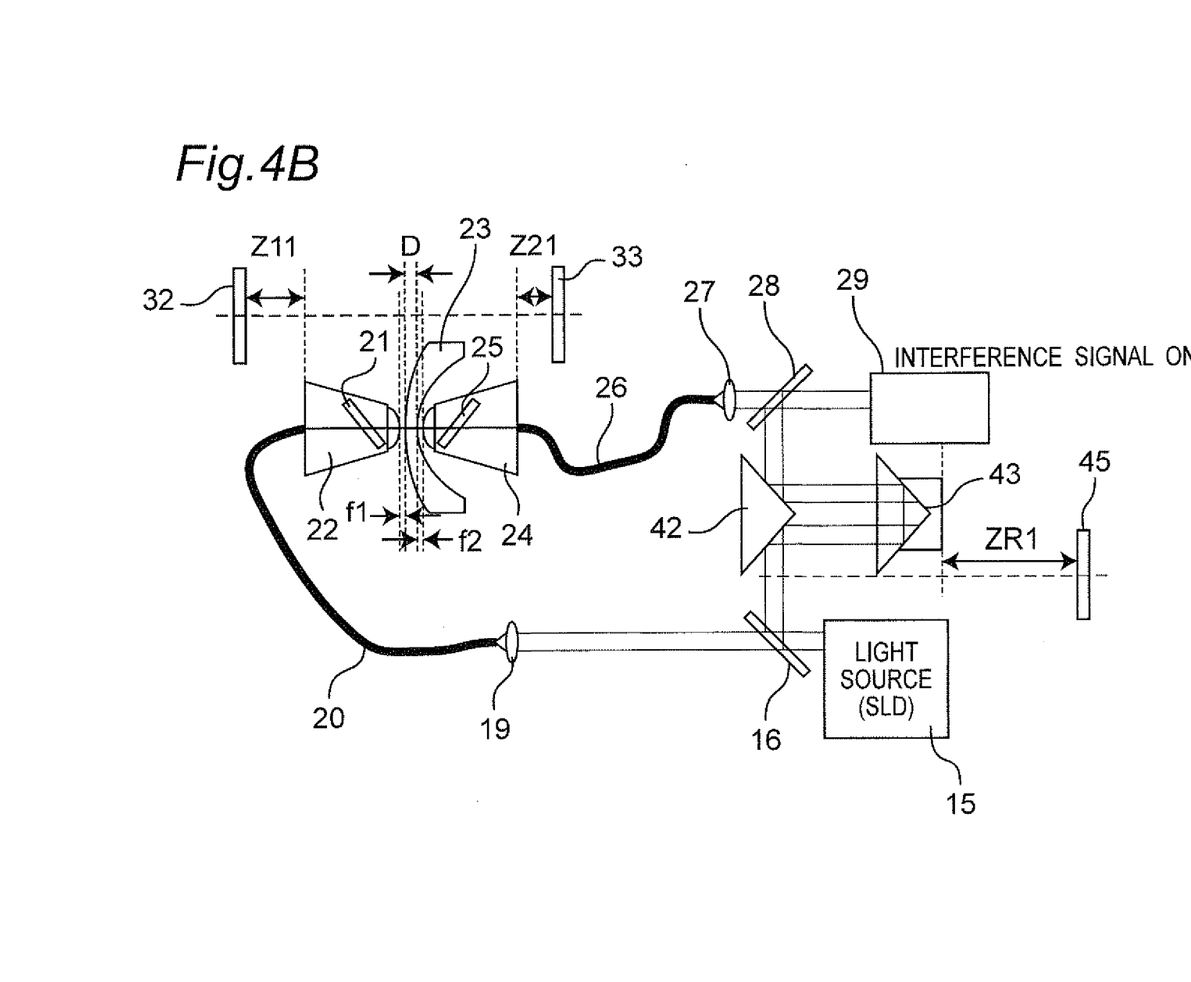
FIG. 4B is a view showing a principle for when the test object is measured in the refractive index measuring apparatus of the first embodiment.

FIG. 4A is a view showing a principle for when a reference object is measured in the first embodiment of the present invention, and FIG. 4B is a view showing a principle for when a test object is measured in the first embodiment of the present invention.

In the present embodiment, the above-described (equation 1) to (equation 3) are obtained using the relationship between $ZR0$, $ZR1$, $Z10$, $Z11$, $Z20$, $Z21$, $D0$, $D$, $f1$, and $f2$ such as those shown in FIGS. 4A and 4B.

Figure 5:
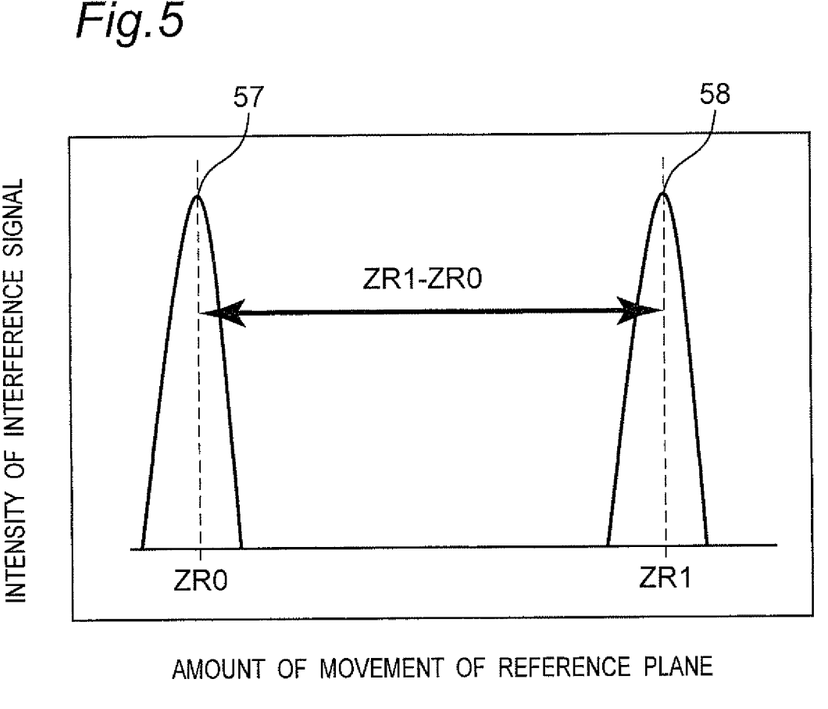
FIG. 5 is a graph of the intensity of interference light in the refractive index measuring apparatus of the first embodiment.

FIG. 5 is a view showing a graph of the intensity of interference light in the first embodiment of the present invention.

In FIG. 5, the amount of movement of the reference plane is taken on a horizontal axis and the intensity of interference light is taken on a vertical axis. Here, the intensity of interference light for when the reference object 51 is measured which is shown in FIG. 4A is 57, and the intensity of interference light for when the test object is measured which is shown in, FIG. 4B is 58. These interference lights exist only when the optical path difference between the test light 17 and the reference light 18 reaches the coherence length of the light source or less, and the half-width of the intensities thereof is substantially equal to the half-width of a wavelength included in the light source.

Note that refractive index in the present embodiment is group refractive index taking into account wavelength dispersion, and is not refractive index for a single wavelength (phase refractive index).

Note that by appropriately combining any of the above-described various embodiments or modifications, effects respectively provided thereby can be provided.

Industrial Applicability

According to the refractive index measuring apparatus according to the present invention, the refractive index of a test object of any shape can be measured easily by a method that is free from breakage and that does not use a matching liquid. By this, the present invention can be used for, for example, a refractive index distribution measuring device for molded lens which is used for cameras, etc.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A refractive index measuring apparatus comprising:
a light source;
a beam splitter that splits light from the light source into test light and reference light;
a first probe optical system that collects the test light and then irradiates the test light onto a surface of a test object;
a second probe optical system that collects the test light transmitted through the test object;
a driving unit that displaces the first probe optical system and the second probe optical system on one optical axis such that an optical axis of the first probe optical system and an optical axis of the second probe optical system maintain coaxiality;

a light-receiving element that allows the test light collected by the second probe optical system to interfere with the reference light and thereby obtains an interference signal; and a calculating unit that calculates a refractive index of the test object, based on the interference signal obtained by the light-receiving element, wherein a probe of one of the first probe optical system and the second probe optical system has an end with an exposed part and a non-exposed part, wherein a diameter of the exposed part is smaller than a wavelength of light irradiated therefrom and the non-exposed part is covered with an opaque covering layer.

2. The refractive index measuring apparatus according to claim 1, wherein the calculating unit calculates the refractive index of the test object, based on a calculated value of an interference signal of the test object and a calculated value of an interference signal which is obtained in advance using, instead of the test object, a reference object whose refractive index and thickness are known.

3. The refractive index measuring apparatus according to claim 2, further comprising:

a first length measuring unit that range-finds positions of the first probe optical system and the second probe optical system, as differences from reference positions of the respective probe optical systems;

a reference light mirror that is provided in an optical path of the reference light and adjusts an optical path length of the reference light; and a second length measuring unit that range-finds a position of the reference light mirror, as a difference from a reference position of the reference light mirror, wherein the refractive index N of the test object is calculated by the calculating unit using an equation $N=(2\Delta ND+N0 \times D0)/(\Delta D+D0)$, wherein the refractive index of the reference object is $N0$, the thickness of the reference object is $D0$, a total of the differences from the reference positions of the respective probe optical systems is $\Delta D$, and the difference from the reference position of the reference mirror is $\Delta ND$.

4. The refractive index measuring apparatus according to claim 1, wherein a probe of the other one of the first probe optical system and the second probe optical system has an end with an exposed part and a non-exposed part, wherein a diameter of the exposed part is smaller than a wavelength of light irradiated therefrom and the non-exposed part is covered with a transparent covering layer.

5. The refractive index measuring apparatus according to claim 1, wherein a probe of the other one of the first probe optical system and the second probe optical system has an end with an exposed part and a non-exposed part, wherein a diameter of the exposed part is exposed without a covering layer.

6. The refractive index measuring apparatus according to claim 1, further comprising:

a moving mechanism that moves the first probe optical system and the second probe optical system in a coordinated manner with the coaxiality being maintained, wherein the test object is scanned while the first probe optical system and the second probe optical system are allowed to move, to calculate a refractive index distribution of the test object.

\* \* \* \* \*